(12) United States Patent
Swinderman

(10) Patent No.: US 7,967,129 B2
(45) Date of Patent: Jun. 28, 2011

(54) CONVEYOR BELT TRAINING IDLER WITH A LOCKING MECHANISM

(75) Inventor: Robert Todd Swinderman, Palm Coast, FL (US)

(73) Assignee: Martin Engineering Company, Neponset, IL (US)

(*) Notice: Subject to any disclaimer, the term of this patent is extended or adjusted under 35 U.S.C. 154(b) by 372 days.

(21) Appl. No.: 12/234,972

(22) Filed: Sep. 22, 2008

(65) Prior Publication Data
US 2010/0072032 A1    Mar. 25, 2010

(51) Int. Cl.
*B65G 15/08* (2006.01)
(52) U.S. Cl. ......... 198/825; 198/808; 198/809; 198/818
(58) Field of Classification Search .................. 198/782, 198/808, 809, 818, 819, 825, 830
See application file for complete search history.

(56) References Cited

U.S. PATENT DOCUMENTS

| | | | |
|---|---|---|---|
| 2,655,252 A * | 10/1953 | Spurgeon ..................... | 198/806 |
| 3,303,924 A | 2/1967 | Hartzell, Jr. | |
| 3,368,665 A * | 2/1968 | Jinkins ........................... | 198/806 |
| 3,593,841 A * | 7/1971 | Leow ............................ | 198/806 |
| 3,669,194 A | 6/1972 | Zurek | |
| 4,241,825 A * | 12/1980 | Brouwer ....................... | 198/782 |
| 4,693,363 A * | 9/1987 | Kuehnert ...................... | 198/807 |
| 5,138,825 A | 8/1992 | Trefz et al. | |
| 5,222,594 A * | 6/1993 | Sumino ......................... | 198/808 |
| 5,358,098 A * | 10/1994 | Sundstrom et al. ........... | 198/806 |
| 5,743,378 A | 4/1998 | Hovstø et al. | |
| 5,950,806 A * | 9/1999 | Warneke ....................... | 198/806 |
| 6,173,830 B1 * | 1/2001 | Cumberlege et al. ......... | 198/842 |
| 6,405,854 B1 * | 6/2002 | Cumberlege .................. | 198/806 |
| 6,776,280 B2 * | 8/2004 | Gaarden ....................... | 198/806 |
| 7,051,867 B2 * | 5/2006 | Sharp ............................ | 198/806 |
| 7,614,493 B2 * | 11/2009 | Dowling et al. .............. | 198/806 |
| 7,669,709 B2 * | 3/2010 | Hovsto et al. ................ | 198/806 |

OTHER PUBLICATIONS

Superior Industries, Self-Aligner Idlers, http://www.superior-ind.com/si_detview.aspx?id=prdd&pid=633156893074860349, 2 pages.
ASGCO Complete Conveyor Solutions, ASGCO Tracking Idlers: ASGCO's Tru-Trainer Belt Tracker and Specialty Idlers, http://www.asgco.com/Specialty_Idlers.asp, 3 pages.
Martin Engineering, Martin Tracker Belt Tracking Systems, http://www.martin-eng.com/products/martin-tracker-belt-tracking-systems, 2 pages.
FLEXCO, Belt Positioners and Trainers, http://www.flexco.com/industry/view_exp.cfm?p_pc_id=7, 1 page.
ASGCO Complete Conveyor Solutions, Troughing Tru-Trainer, conveyor belt tracking system, http://www.asgco.com/tru_trainer.shtml, 1 page. FLEXCO, PT Max Belt Trainers product brochure, www.flexco.com, 2 pages.
MAX-A-LINE Belt Trainers, product brochure, 2 pages.

* cited by examiner

*Primary Examiner* — Douglas A Hess
(74) *Attorney, Agent, or Firm* — Thompson Coburn LLP; Clyde L. Smith

(57) ABSTRACT

A conveyor belt training idler comprise a mount, a roller support frame, a roller, and a locking mechanism. The roller support frame is pivotally attached to the mount about a support frame axis for pivotal movement relative to the mount. The roller is rotatably attached to the roller support frame for rotation about a roller axis. The roller axis is pivotal with the roller support frame about the support frame axis relative to the mount. The locking mechanism has a plurality of discrete settings, each setting being configured and adapted to maintain the roller support frame at a discrete angular setting relative to the mount.

16 Claims, 5 Drawing Sheets

CONVEYOR BELT TRAINING IDLER WITH A LOCKING MECHANISM

CROSS-REFERENCE TO RELATED APPLICATIONS

None.

STATEMENT REGARDING FEDERALLY SPONSORED RESEARCH OR DEVELOPMENT

Not Applicable.
Appendix
Not Applicable.

BACKGROUND OF THE INVENTION

1. Field of the Invention

This invention relates generally to bulk material belt conveyor systems. More specifically, this invention pertains to training idlers for controlling belt tracking on conveyor belt systems.

2. General Background Technology

All bulk material belt conveyor systems comprise a belt that extends in a continuous loop around rollers. The upper portion of the continuous loop can be referred to as a transfer run and the lower portion of the continuous loop can be referred to as a return run. To maintain proper belt tracking, bulk material conveyor belt systems are typically provided with training idlers. Such training idlers are utilized on both transfer and return runs and typically take the form of one or more rollers mounted on a roller support frame that is pivotable about a vertical (or near vertical) axis. When a conveyor belt tracks of center, the uneven drag or friction acting on the training idler causes the roller support frame to pivot about the axis in manner such that the rollers no longer rotate about axes that are perpendicular to the direction of belt travel. As such, the rollers act to redirect the belt back into alignment. In some cases, outrigger rollers or shoes are provided at the opposite ends of the roller support frame to assist in pivoting the support frame. The shoes or the outrigger rollers extend above the edges of the belt and are spaced from each other by a distance that is greater than the belt width. When the belt is out of alignment enough to contact one of the shoes or one of the rollers, the drag generated by the shoe or roller creates additional torque on the roller support frame that assists in pivoting the support frame.

In practice, bulk material conveyor belt systems often track off center for various reasons including off-center loading of the bulk material and misalignment of the conveyor components or structure. In some cases, belts track off center to one specific side for an appreciable duration of time. In such situations, maintenance workers have been known to tie off the training idlers to other structure so as to force their roller support frames to be skewed off center by at least a set amount. This is often done with wire, which creates a danger to the workers because it can become entangled in moving components of the conveyor belt systems.

SUMMARY OF THE INVENTION

The present invention provides for a safe and easy way to ensure that a training idler will be skewed off center in a specific direction by at least a minimum amount. The invention can be practiced in connection with new training idlers and by modifying existing training idlers.

In one aspect of the invention, a conveyor belt training idler comprises a mount, a roller support frame, a roller, and a locking mechanism. The roller support frame is pivotally attached to the mount about a support frame axis for pivotal movement relative to the mount. The roller is rotatably attached to the roller support frame for rotation about a roller axis. The roller axis is pivotal with the roller support frame about the support frame axis relative to the mount. The locking mechanism has a plurality of discrete settings, each setting being configured and adapted to maintain the roller support frame at a discrete angular setting relative to the mount.

In another aspect of the invention, a conveyor belt training idler comprises a mount, a roller support frame, a roller, and a locking mechanism. The roller support frame is pivotally attached to the mount about a support frame axis for pivotal movement relative to the mount. The roller is rotationally attached to the roller support frame about a roller axis for rotation relative to the roller support frame. The roller axis is pivotal with the roller support frame about the support frame axis relative to the mount. The locking mechanism comprises a swing arm and a catch device. The swing arm is pivotally attached to the roller support frame about a swing arm axis for pivotal movement relative to the roller support frame. The swing arm axis is pivotal with the roller support frame relative to the mount. The catch device is fixed relative to the mount and comprises a plurality of catches. Each of the catches is engageable with the swing arm in a manner limiting pivotal movement of the swing arm and the roller support frame about the support frame axis relative to the mount. The swing arm is disengageable from each of the catches by pivoting the swing arm about the swing arm axis relative to the roller support frame.

Another aspect of the invention pertains to a method of modifying a bulk material conveyor belt system, which comprises a step of accessing a conveyor belt training idler. The conveyor belt training idler comprises a mount, a roller support frame, and a roller. The roller support frame is pivotally attached to the mount about a support frame axis for pivotal movement relative to the mount. The roller is rotatably attached to the roller support frame for rotation about a roller axis. The roller axis is pivotal with the roller support frame about the support frame axis relative to the mount. The method also comprises a step of attaching a locking mechanism to the conveyor belt system. The locking mechanism comprising a swing arm and a catch device. The swing arm is pivotally attached to the roller support frame about a swing arm axis for pivotal movement relative to the roller support frame. The swing arm axis is pivotal with the roller support frame about the support frame axis relative to the mount. The catch device is fixed relative to mount and comprises a plurality of catches. Each of the catches is engageable with the swing arm in a manner limiting pivotal movement of the swing arm and the roller support frame about the support frame axis relative to the mount. The swing arm is disengageable from each of the catches by pivoting the swing arm about the swing arm axis relative to the roller support frame.

In yet another aspect of the invention, a method of adjusting a conveyor belt training idler comprises a step of accessing a conveyor belt training idler. The conveyor belt training idler comprising a mount, a roller support frame, a roller, and a locking mechanism. The roller support frame is pivotally attached to the mount about a support frame axis for pivotal movement relative to the mount. The roller is rotationally attached to the roller support frame about a roller axis for rotation relative to the roller support frame. The roller axis is pivotal with the roller support frame about the swing arm axis relative to the mount. The locking mechanism comprises a swing arm and a catch device. The swing arm is pivotally attached to the roller support frame about a swing arm axis for pivotal movement relative to the roller support frame. The swing arm axis is pivotal with the roller support frame about the support frame axis relative to the mount. The catch device is fixed relative to mount and comprises a plurality of catches. Each of the catches is engageable with the swing arm in a manner limiting pivotal movement of the swing arm and the roller support frame about the support frame axis relative to the mount. The method also comprises a step of disengaging the swing arm from one of the catches by pivoting the swing arm about the swing arm axis relative to the roller support frame. Additionally, the method comprises a step of pivoting the roller support frame about the support frame axis relative to the mount via the swing arm. Still further, the method comprises a step of engaging the swing arm with another one of the catches.

Further features and advantages of the present invention, as well as the operation of various embodiments of the present invention, are described in detail below with reference to the accompanying drawings.

Figure 1:
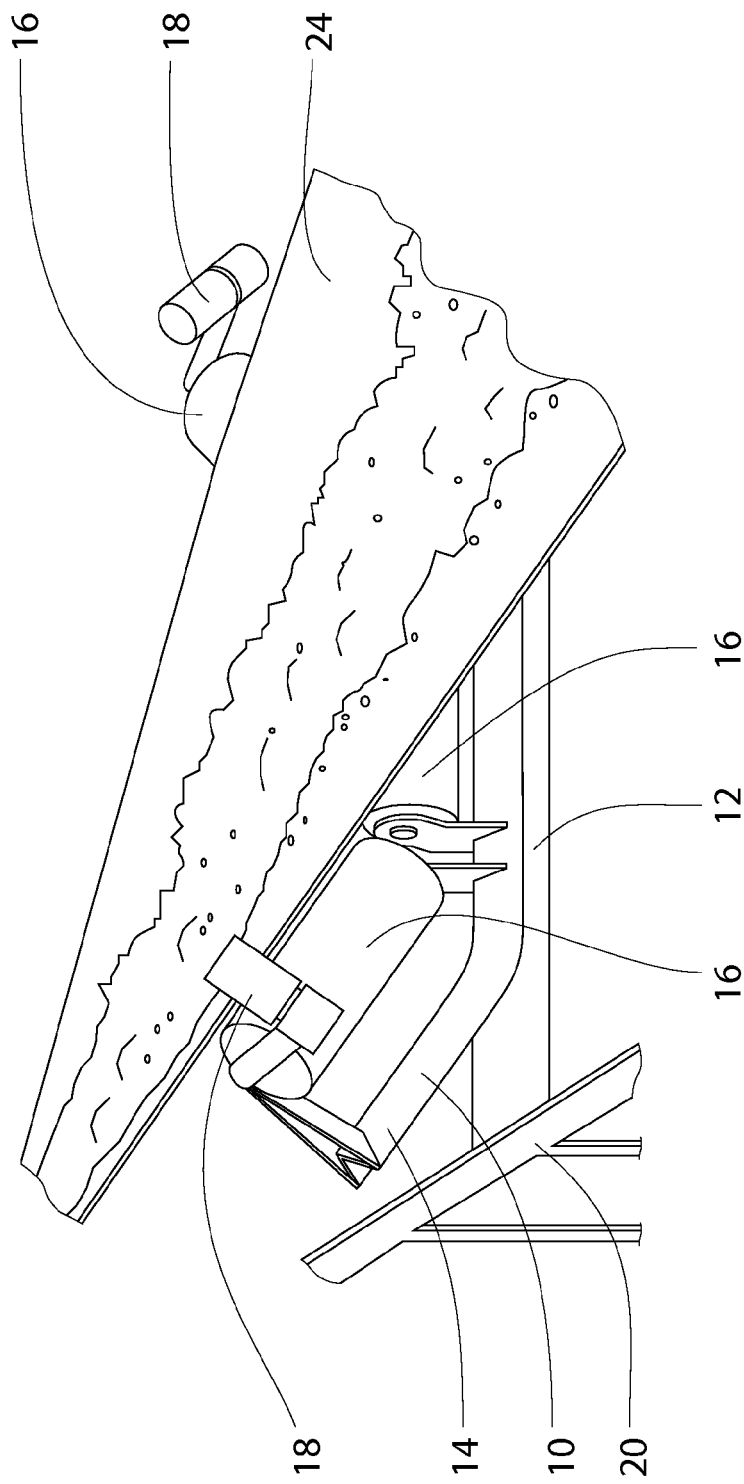
FIG. 1 perspective view of the of a prior art conveyor belt training idler that comprises outrigger rollers and that is "tied-off" with wire.

Reference numerals in the written specification and in the drawing figures indicate corresponding items.

DETAILED DESCRIPTION OF THE INVENTION

Figure 2:
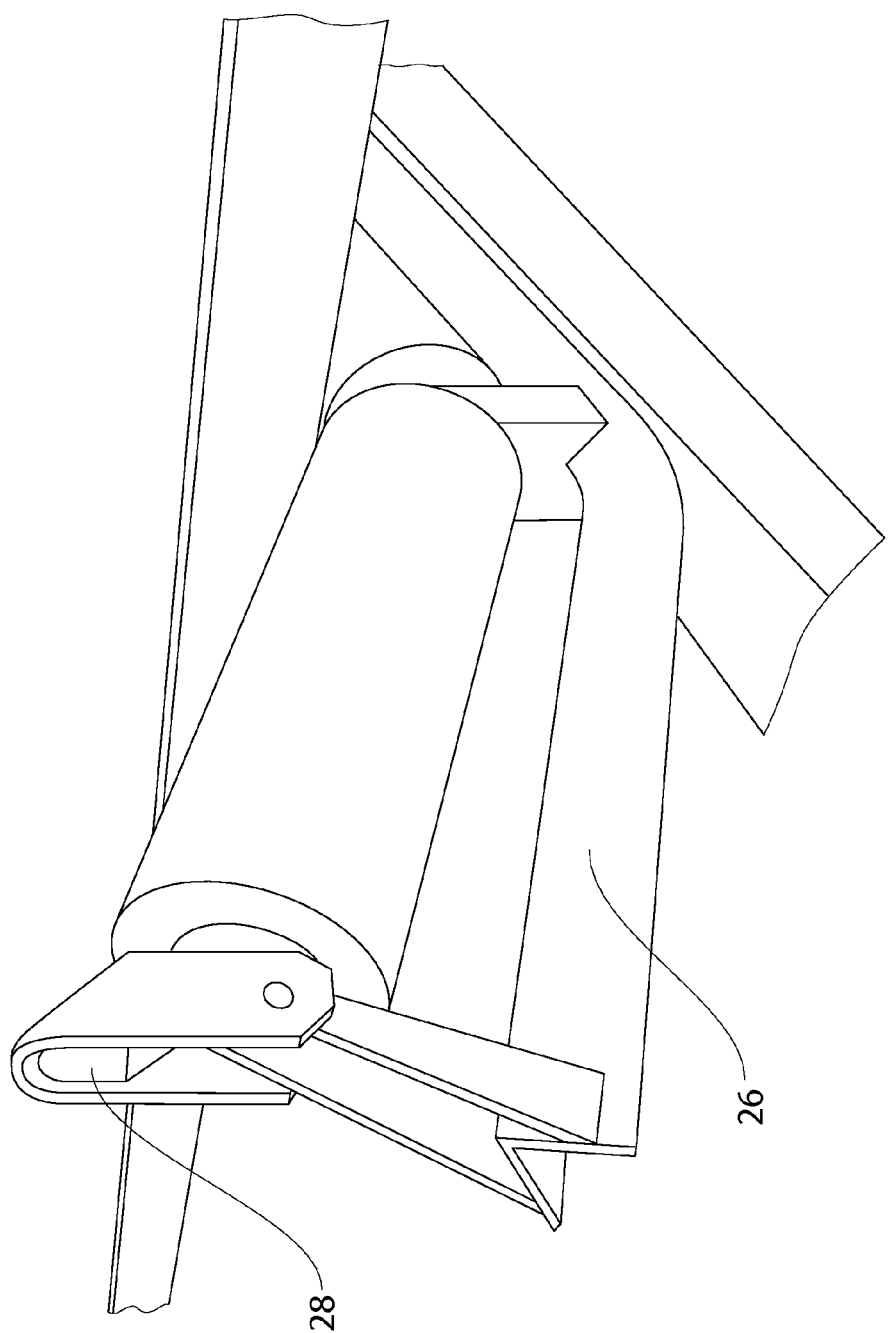
FIG. 2 is a perspective view of a prior art conveyor belt training idler that comprises outrigger shoes.

FIG. 1 depicts a prior art training idler 10. The training idler 10 comprises a mount 12, a roller support frame 14, three rollers 16, and outrigger rollers 18. The mount 12 is fixed to the frame 20 of a bulk material conveyor belt system 22. The roller support frame 14 is pivotally connected to the mount 12 for pivotal movement about a vertically oriented support frame axis. The rollers 16 are rotationally mounted to the roller support frame 14 about roller axes that pivot with the roller support frame about the support frame axis relative to the mount 12. The outrigger rollers 18 are also rotationally mounted to the roller support frame 14 and pivot with the roller support frame about the support frame axis relative to the mount 12. However, the outrigger rollers 18 extend above the belt 24 of the bulk material conveyor belt system 22 adjacent each of the opposite edges of the belt. A slightly different prior art training idler 26 is shown in FIG. 2 and comprises outrigger shoes 28 rather than outrigger rollers.

Figure 3:
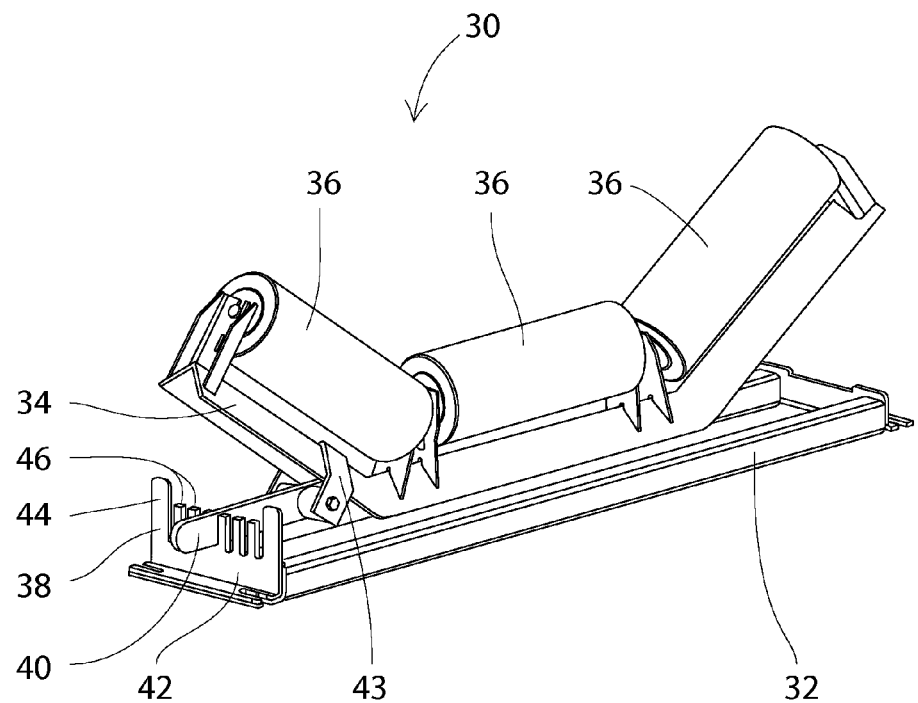
FIG. 3 is a perspective view of a modified training idler in accordance with the invention and is shown with the idler in its neutral position.
Figure 4:
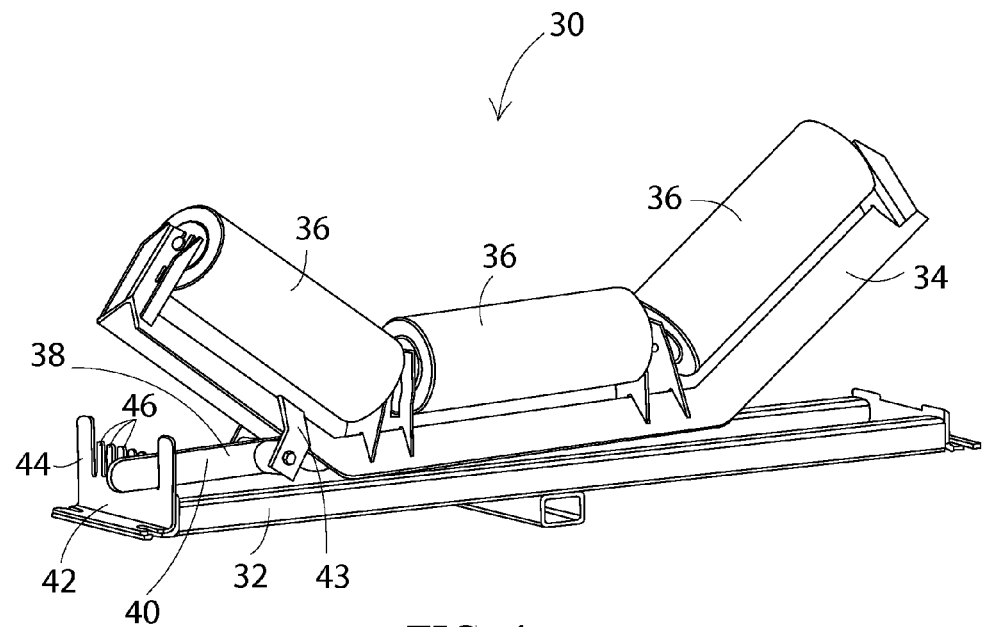
FIG. 4 is a perspective view of the modified training idler shown in FIG. 3 and is shown with the idler skewed to one side.

A training idler 30 in accordance with the invention is shown in FIGS. 3 and 4. The training idler 32 comprises a mount 32, a roller support frame 34, three rollers 36, and a locking mechanism 38. The mount 32 is configured to be fixed to the frame of a bulk material conveyor belt system. The roller support frame 34 is pivotally connected to the mount 32 for pivotal movement about a support frame axis. The rollers 36 are rotationally mounted to the roller support frame 34 about roller axes that pivot with the roller support frame about the support frame axis relative to the mount 32. Configured as shown, the rollers 36 and the roller support frame 34 are adapted to support a belt having a trough shaped cross-section. As such the roller axes are oriented in a U-shaped manner. However, it should be appreciated that the invention is also applicable to training idlers in which the roller axes are aligned or those comprising only a single roller for use in connection with flat belts.

Figure 5:
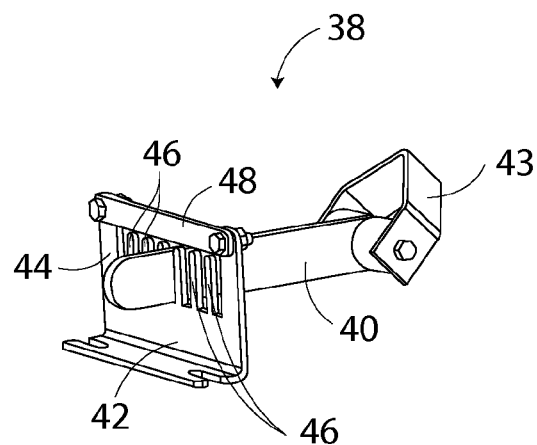
FIG. 5 is a perspective view of components that can be used to convert a standard training idler into modified training idler in accordance with the invention.

The locking mechanism 38 is shown by itself in FIG. 5 and preferably comprises a swing arm 40 and a catch device 42. The swing arm 40 is preferably a simple bar of steel and is pivotally attached to the roller support frame 34 about a swing arm axis via a clamp member 43. As such, the swing arm 40 is configured to pivot with the roller support frame 34 about the support frame axis relative to the mount 32. The swing arm axis is preferably oriented perpendicular to the support frame axis and in a manner such that the swing arm 40 can be raised and lowered relative to the mount 32. The catch device 42 preferably comprises a slotted member 44 that is fixed in position relative to the mount 32. Preferably, the slotted member 44 is adapted to be bolted directly to the mount 32 using the same bolts that secure the mount to a frame of a bulk material conveyor belt system. The slotted member 44 comprises a plurality of upwardly protruding teeth 46 that define slots therebetween. The slots are configured to be wider than the swing arm 40. Although the slots may be appreciably wider than the swing arm 40, the swing arm preferably with minimal play in each of the slots.

In use, each slot of the slotted member 44 is adapted to receive the swing arm 40 by lowering the swing arm into the slot. To adjust the training idler 30, the swing arm is pivoted upwards about the swing arm axis such that it is above the teeth 46 of the slotted member 44. The swing arm 40 can then be used to pivot the roller support frame 34 about the support frame axis relative to the mount 32. When the roller support frame 34 is in a desired orientation, the swing arm 40 can be pivoted downward into one of the slots of the slotted member 44, and released. With the swing arm 40 passing through one of the slots of the slotted member 44, the teeth 46 adjacent the slot act as catches that limit the degree to which the swing arm and roller support frame can pivot about the support frame axis relative to the mount. Preferably, the degree to which the swing arm 40 can pivot within each slot is close to zero. Thus, it should be appreciated that the training idler 30 can be adjusted so that the roller support frame 40 can be repositioned to various alternative angular settings relative to the mount 32. Each such setting can be configured to allow the roller support frame 34 to pivot through a discrete angular range or not at all. Preferably, the angular settings are configured to confine the roller support frame 34 to seven discrete angular settings ranging from negative 7.5 degrees to positive 7.5 degrees from a neutral position, in 2.5 degree increments (the neutral position being where the roller axes are perpendicular to the direction of belt travel). If desired, a blocking member 48 can be attached to the slotted member 44 as shown in FIG. 5. The blocking member 48 can serve two purposes. First, the blocking member 48 can be secured above the teeth 46 of the slotted member 44 with the swing arm 40 in one of the slots to prevent the swing arm from pivoting upwards.

Thus, the blocking member 48 can prevent the roller support frame 34 from being pivotally adjusted without first removing the blocking member. Second, the blocking member 48 can be secured above the teeth 46 of the slotted member 44 with the swing arm 40 out of the slots to prevent the swing arm from pivoting downwards into a slot. This allows the swing arm 40 to slide along the blocking member 48 over the teeth 46 and therefore allows the roller support frame 34 to of the training idler 30 to pivot freely about the support frame axis relative to the mount 32.

Figure 6:
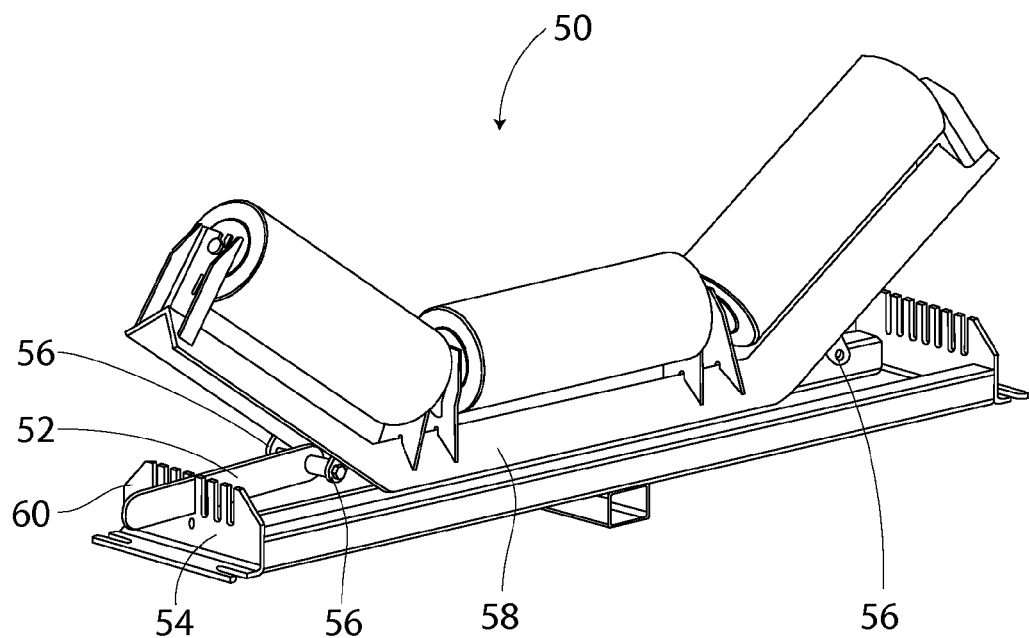
FIG. 6 is a perspective view of an alternative embodiment of a training idler in accordance with the invention.

It should be appreciated that many conventional training idler could be modified in accordance with the invention by simply adding the above-described locking mechanism 38 to them in the field. Alternatively, a training idler in accordance with the invention can be original equipment. A preferred embodiment of such an original equipment training idler 50 is shown in FIG. 6. The swing arm 52 of the locking mechanism 54 of this training idler 50 is pivotally attached to bosses 56 that are welded to the roller support frame 58, thereby eliminating the need for a clamp member. Similarly, the slotted member 60 is formed as an integral part of the mount, thereby eliminating an assembly step in the field. Preferably, training idler 50 has bosses 56 and a slotted member 60 on both of its sides such that the swing arm 52 can be attached to either side of the training idler 50.

Figure 7:
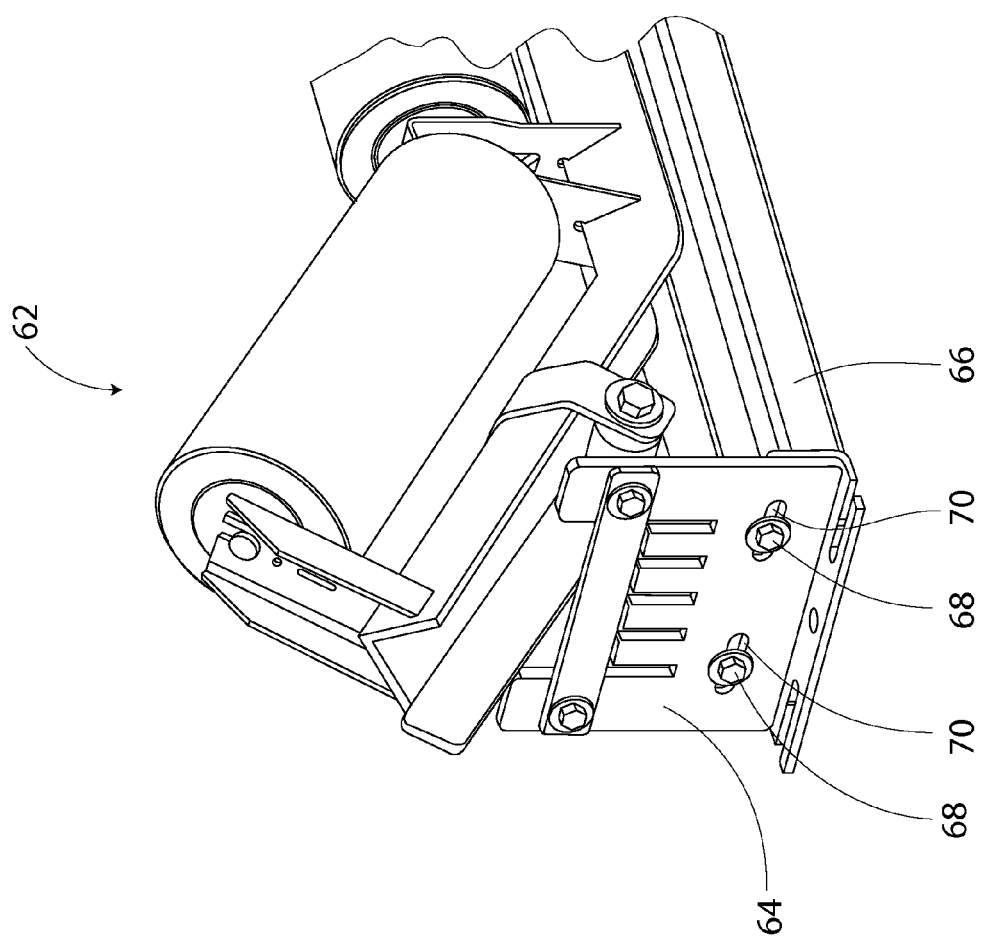
FIG. 7 is a perspective detail view of the locking mechanism of yet another alternative embodiment of the invention and is shown in its free floating configuration.

A detail view of yet another embodiment of a training idler 62 in accordance with the invention is shown in FIG. 7. In this embodiment, the slotted member 64 is separately attached to the mount 66 via bolts 68. The bolt holes 70 are slotted such that the relative position between the slotted member 64 and the mount 66 can be adjusted slightly. This allows the angular settings of the training idler 62 to be adjusted or skewed to one direction or the other.

In view of the foregoing, it should be appreciated that the invention achieves the several advantages over prior art methods and devices. For example, the invention eliminates the need to tie-off training idlers using wire, thereby eliminating safety risks. Additionally, the preferred configurations allow the swing arm to be used to pivot the roller support frame, which can be done without reaching under the belt. Thus, the roller support frame can be adjusted while the belt is in operation.

As various modifications could be made in the constructions and methods herein described and illustrated without departing from the scope of the invention, it is intended that all matter contained in the foregoing description or shown in the accompanying drawings shall be interpreted as illustrative rather than limiting. For example, although not shown with outrigger rollers or shoes, any one of the above described training idler embodiments can include outrigger rollers or shoes. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A conveyor belt training idler comprising:
   a mount;
   a roller support frame, the roller support frame being pivotally attached to the mount about a support frame axis for pivotal movement relative to the mount;
   a roller, the roller being rotatably attached to the roller support frame for rotation about a roller axis, the roller axis being pivotal with the roller support frame about the support frame axis relative to the mount; and
   a locking mechanism, the locking mechanism having a plurality of discrete settings, each setting being configured and adapted to maintain the roller support frame at a discrete angular setting relative to the mount.

2. A conveyor belt training idler in accordance with claim 1 wherein each of the angular settings prevents the roller axis from moving relative to the mount.

3. A conveyor belt training idler in accordance with claim 1 wherein each of the angular settings allows the roller axis and the roller support frame to pivot within a discrete range of angular positions relative to the mount.

4. A conveyor belt training idler in accordance with claim 1 wherein the support frame axis and the roller axis lie in a common plane.

5. A conveyor belt training idler in accordance with claim 1 wherein the locking mechanism comprises a swing arm and a catch device, the swing arm is pivotally attached to the roller support frame about a swing arm axis for pivotal movement relative to the roller support frame, the swing arm axis is pivotal with the roller support frame relative to the mount, the catch device is fixed relative to the mount, the catch device comprises a plurality of catches, each of the catches is engageable with the swing arm in a manner limiting pivotal movement of the swing arm and the roller support frame about the support frame axis relative to the mount, and the swing arm is disengageable from each of the catches by pivoting the swing arm about the swing arm axis relative to the roller support frame.

6. A conveyor belt training idler in accordance with claim 5 wherein the swing arm axis lies in a plane that is perpendicular to the support frame axis.

7. A conveyor belt training idler in accordance with claim 5 wherein the catch device comprises a slotted member that has a plurality of teeth that define slots, and the teeth constitute the catches.

8. A conveyor belt training idler comprising:
   a mount;
   a roller support frame, the roller support frame being pivotally attached to the mount about a support frame axis for pivotal movement relative to the mount;
   a roller, the roller being rotationally attached to the roller support frame about a roller axis for rotation relative to the roller support frame, the roller axis being pivotal with the roller support frame about the support frame axis relative to the mount;
   a locking mechanism, the locking mechanism comprising a swing arm and a catch device, the swing arm being pivotally attached to the roller support frame about a swing arm axis for pivotal movement relative to the roller support frame, the swing arm axis being pivotal with the roller support frame relative to the mount, the catch device being fixed relative to the mount, the catch device comprising a plurality of catches, each of the catches being engageable with the swing arm in a manner limiting pivotal movement of the swing arm and the roller support frame about the support frame axis relative to the mount, the swing arm being disengageable from each of the catches by pivoting the swing arm about the swing arm axis relative to the roller support frame.

9. A conveyor belt training idler in accordance with claim 8 wherein the swing arm axis lies in a plane that is perpendicular to the support frame axis.

10. A conveyor belt training idler in accordance with claim 8 wherein the catch device comprises a slotted member that has a plurality of teeth that define slots, and the teeth constitute the catches.

11. A method of modifying a bulk material conveyor belt system, the method comprising:
   accessing a conveyor belt training idler, the conveyor belt training idler comprising a mount, a roller support frame, and a roller, the roller support frame being pivotally attached to the mount about a support frame axis for pivotal movement relative to the mount, the roller being rotationally attached to the roller support frame about a roller axis for rotation relative to the roller support frame, the roller axis being pivotal with the roller support frame relative to the mount; and
   attaching a locking mechanism to the conveyor belt system, the locking mechanism comprising a swing arm and a catch device, the swing arm being pivotally attached to the roller support frame about a swing arm axis for pivotal movement relative to the roller support frame, the swing arm axis being pivotal with the roller support frame relative to the mount, the locking member being fixed relative to the mount, the catch device comprising a plurality of catches, each of the catches being engageable with the swing arm in a manner limiting pivotal movement of the swing arm and the roller support frame about the support frame axis relative to the mount, the swing arm being disengageable from each of the catches by pivoting the swing arm about the swing arm axis relative to the roller support frame.

12. A method in accordance with claim 11 wherein the step of attaching a locking mechanism to the conveyor belt system occurs in a manner such that the swing arm axis lies in a plane that is perpendicular to the support frame axis.

13. A method in accordance with claim 11 wherein the catch device comprises a slotted member that has a plurality of teeth that define slots, and the teeth constitute the catches.

14. A method of adjusting a conveyor belt training idler comprising:
   accessing a conveyor belt training idler, the conveyor belt training idler comprising a mount, a roller support frame, a roller, and a locking mechanism, the roller support frame being pivotally attached to the mount about a support frame axis for pivotal movement relative to the mount, the roller being rotationally attached to roller support frame about a roller axis for rotation relative to the roller support frame, the roller axis being pivotal with the roller support frame relative to the mount, the locking mechanism comprising a swing arm and a catch device, the swing arm being pivotally attached to the roller support frame about a swing arm axis for pivotal movement relative to the roller support frame, the swing arm axis being pivotal with the roller support frame relative to the mount, the catch device being fixed relative to mount, the catch device comprising a plurality of catches, each of the catches being engageable with the swing arm in a manner limiting pivotal movement of the swing arm and the roller support frame about the roller support axis relative to the mount;
   disengaging the swing arm from one of the catches by pivoting the swing arm about the swing arm axis relative to the roller support frame;
   pivoting the roller support frame about the support frame axis via the swing arm; and
   engaging the swing arm with another one of the catches.

15. A method in accordance with claim 14 wherein the step of attaching a locking mechanism to the conveyor belt system occurs in a manner such that the swing arm axis lies in a plane that is perpendicular to the support frame axis.

16. A method in accordance with claim 14 wherein the catch device comprises a slotted member that has a plurality of teeth that define slots, and the teeth constitute the catches.

* * * * *